Figure 4:
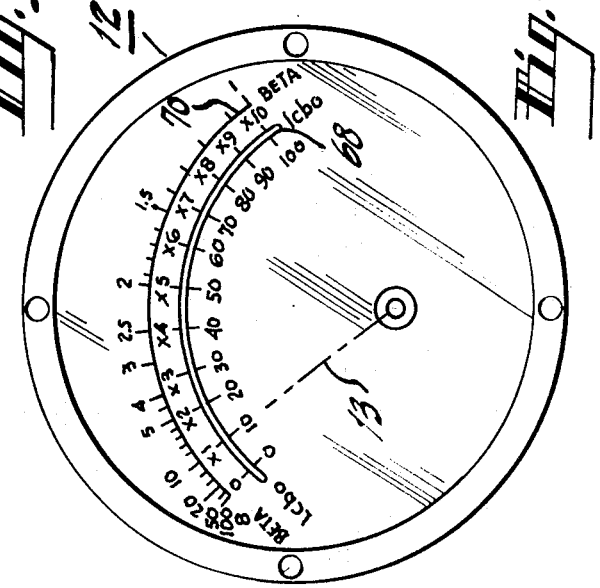

United States Patent

[11] 3,594,640

[72] Inventor Sander L. Knanishu
 Tappan, N.Y.
[21] Appl. No. 705,356
[22] Filed Feb. 14, 1968
[45] Patented July 20, 1971
[73] Assignee RCA Corporation

[54] CIRCUIT AND METHOD FOR MEASURING THE AMPLIFICATION FACTOR OF AN IN-CIRCUIT OR OUT-OF-CIRCUIT TRANSISTOR
 10 Claims, 4 Drawing Figs.

[52] U.S. Cl. ............................................. 324/158 T
[51] Int. Cl. .............................................. G01r 31/22
[50] Field of Search ................................ 324/158,
 158 T, 57

[56] References Cited
UNITED STATES PATENTS
3,227,953 1/1966 Cerveny .................... 324/158

OTHER REFERENCES
Hempel; R. A.; " A Transistor Tester For The Experimental Lab;" February 1958; ELECTRONICS INDUSTRIES; pages 58— 61, copy in 324—158.

ELECTRONICS, " Automatic Measurement Of Transistor Beta" by E. P. Hojak, Dec. 4, 1959, pages 114— 5.

Primary Examiner—Rudolph V. Rolinec
Assistant Examiner—Ernest F. Karlsen
Attorney—Edward J. Norton ABSTRACT: A method and a circuit for measuring the amplification factor (beta) of an in-circuit transistor is disclosed. A first potential of one polarity is applied across a first fixed resistor and the collector-emitter path of the transistor. A second potential of opposite polarity is applied across a first variable resistor and the first fixed resistor, the resistance of the first variable resistor being adjusted until the net voltage across the first fixed resistor is zero. The first potential is also applied through a second fixed resistor, a second variable resistor, and the base-emitter path of the transistor, and the second variable resistor is adjusted until a predetermined current flows through the first fixed resistor and the collector-emitter path of the transistor. A meter is provided for measuring the current through the first and second fixed resistors and obtaining their ratio.

PATENTED JUL 20 1971 3,594,640

INVENTOR
SANDER L. KNANISHU

Simon Yaffee
Attorney 3,594,640

CIRCUIT AND METHOD FOR MEASURING THE AMPLIFICATION FACTOR OF AN IN-CIRCUIT OR OUT-OF-CIRCUIT TRANSISTOR

BACKGROUND

A transistor amplification factor indicator in which the amplification factor of the transistor can be determined over a very large range of current through the output electrode thereof and by use of very little mental arithmetic is desirable. Furthermore, since transistors are often soldered into the circuit in which they are used, as distinct from being inserted into a socket, a transistor amplification factor indicator which will give the amplification factor of a transistor while it is still connected in its circuit is very often necessary.

It is an object of this invention to provide an improved transistor amplification factor indicator.

It is another object of this invention to provide an in-circuit transistor amplification factor checker.

SUMMARY

In accordance with the invention, a predetermined current is caused to flow between an output electrode and a common electrode of a transistor to be tested by adjusting the resistance in the control electrode to the common electrode circuit of the transistor, the predetermined current being noted on one scale of a meter. Then, the current flowing in the control electrode to the common electrode circuit of the transistor is caused to flow through the same meter and a glance at another scale of the meter indicates the amplification factor of the transistor. If the transistor to be tested is in a circuit, a supply voltage is connected between the output electrode and the common electrode and a bucking voltage is simultaneously applied between the output electrode and the common electrode while the circuit between the control electrode and the common electrode of the transistor is opened, to buck out any currents that flow through the circuits between the output electrode and the common electrode, and any current that flows through the transistor itself due to circuit leakage. Then the amplification factor test is continued as if the transistor being tested were not in a circuit.

DESCRIPTION

Figure 3:
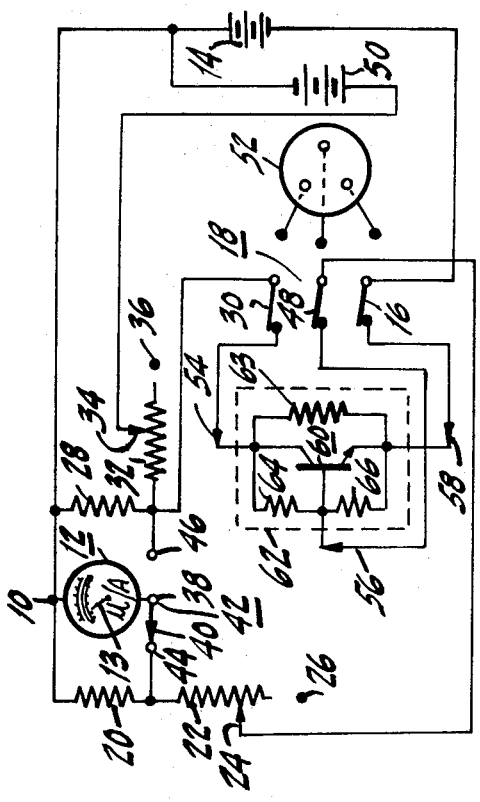
Figure 1:
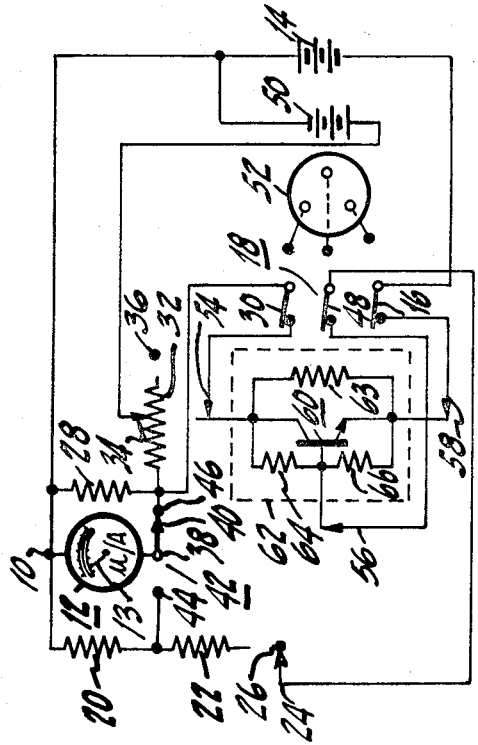
Figure 2:
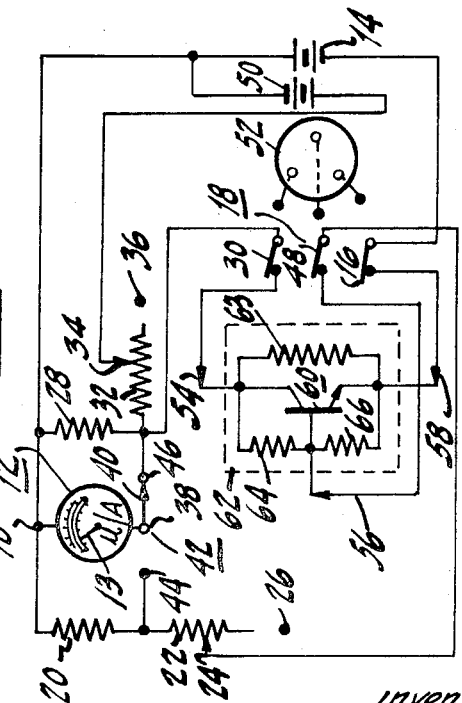

The invention will be better understood upon reading the following description in connection with the accompanying drawing in which FIGS. 1 to 3 illustrate various steps of manipulation of a circuit including an embodiment of the transistor testing circuit of this invention, and FIG. 4 is a view of the scales of the meter used in the circuit of FIGS. 1 to 3.

In the test instrument of FIGS. 1 to 3, one terminal 10 of a microammeter 12 is connected through a source of potential 14 to one moving element 16 of a three-pole, double-throw switch 18. The terminal 10 is also connected through a resistor 20 to one terminal of a variable resistor 22 having a slider 24 and an off terminal or infinite resistance position 26. The terminal 10 is also connected through a resistor 28 to another moving element 30 of the switch 18 and, through the resistor 28 to one terminal of a variable resistor 32 having a slider 34 and an off or infinite resistance terminal 36. The other terminal 38 of the meter 12 is connected to the moving element 40 of a single-pole double-throw switch 42. One contact 44 of the switch 42 is connected to the junction of the resistors 20 and 22, and the other contact 46 of the switch 42 is connected to the junction of the resistors 28 and 32. The slider 24 is connected to the third moving element 48 of the switch 18. A second source 50 is connected between the moving element 16 and the slider 34 through the source 14. As will be noted, the sources 14 and 50 are poled in the same direction away from the moving element 16.

A transistor socket 52 is provided having contact holes for receiving the emitter, collector and the base pins of a transistor having such pins (not shown) to be tested. The contact holes for receiving the collector, the base and the emitter pins of the transistor are connected respectively to the one of the right-hand contacts (as viewed in FIGS. 1—3) of the switch 18 that cooperates with the moving elements 30, 48 and 16 of the switch 18. The left-hand contacts of the switch 18 that cooperate with the moving elements 30, 48 and 16 are connected respectively to probes or contact elements 54, 56 and 58. When a transistor to be tested is of the type that can be inserted into the socket 52, the moving elements of the switch 18 are thrown to the right as viewed in Figure 1 and the transistor to be tested is properly inserted into the socket 52. When the transistor to be tested is not adapted to be inserted into the socket 52, the wires leading from the collector, the base and the emitter thereof are connected respectively to the proves 54, 56 and 58 and the switch 18 is thrown to the left. If it is desired to measure the amplification factor of a transistor 60 which is connected in circuit in an electronic apparatus indicated by the dotted rectangle 62, the probes 54, 56 and 58 are contacted with the collector, the base and the emitter respectively of the transistor 60. The resistor 63 represents the circuit resistance, if any, connected between the collector and the emitter of the transistor 60 and the resistors 64 and 66 represent respectively the circuit resistances, if any, connected between the collector and the base, and the emitter and the base, of the transistor 60.

As shown in Figure 4, the face of the linear meter 12 has a moving needle 13 that moves over two scales 68 and 70. The scale 68 indicates current flow, as will be explained, and is used to indicate the current flowing between the base and the emitter of the transistor under test and also to indicate multiplication factors. The scale 68 is therefore a linear scale in that equal arcuate distances along the scale represent equal amounts of current. The scale 70 indicates the ratio of current flowing in the collector to emitter circuit of the transistor under test to the current flowing in the base to emitter of the transistor under test. Therefore, as will be explained, the beta of the transistor under test may be read directly from the scale 70, or may be derived by simple multiplication of the reading of the scale 70 by the proper one of the multiplication factors of the scale 68.

The meter 12 may have 100 microampere movement exhibiting 1,000-ohm resistance. The resistor 28 may have a resistance of 1 ohm and the resistor 20 may have a resistance of 10 ohms. Therefore, for any predetermined reading of the meter 12 on its scale 68 when the switch element 40 is in contact with the switch point 46, a certain amount of current is flowing through the transistor under test between its collector and emitter. However, with the same predetermined reading on the scale 68 and with the moving element 40 of the switch 42 in contact with the switch point 44, one-tenth of the said certain current flows through the transistor under test between its base and its emitter.

Let it be assumed that the beta of the transistor 60, which is in the circuit of an apparatus 62, is to be measured. Then, the slider 24 of the resistance 22 is put on the infinite resistance point 26 of the resistor 22, the slider 34 being on the infinite resistance point 36 of the resistor 34, whereby very small current will flow through the transistor 60 from its collector to its emitter due to the source 14 which is connected across the collector and the emitter of the transistor 60 by way of the resistance 28. Since, in FIG. 1, the switch 40 is in contact with the switch point 46, the meter should read zero on its scale 68 before the measurement of the beta of the transistor is started. If, however, the meter 12 does not read zero on its scale 68, then the current flow indicated by the meter 12 is assumed to be through one or more of the resistances 63, 64 and 66. The reading of the meter 12 is then brought back to zero by moving the slider 34 along the resistor 32, whereby a bucking voltage, provided by the battery 50, is applied across the resistor 28 and also across the collector to emitter terminals of the transistor 60. This position of the slider 34 is shown in Figure 1.

Then, as shown in Figure 2, with the slider 34 stationary in the position arrived at as explained above, the slider 24 is moved off the point 26 and along the resistor 22 to the point where the needle 13 of the meter 12 reads 10 or X1 on the scale 68, the switch-moving element 40 still being in contact with the switch point 46.

Then, the sliders 34 and 24 remaining in their respective positions as arrived at as explained above, the switch moving element 40 is moved to cause it to contact with the switch point 44, as shown in Figure 3 and the meter scale 70 is read to give the beta of the transistor 60 under test. This beta test is made without taking this transistor 60 out of the apparatus 62 in spite of the fact that shunt circuits for the transistor 60 represented by the elements 63, 64 and 66 are present in the apparatus 62. The accuracy of the beta measurement will be reduced in inverse proportion to the resistances of the shunt elements 63, 64 and 66. However, the accuracy of the beta measurement will be sufficient for many tests and for most circuit repair work.

If the transistor to be tested is not connected in a circuit, it is either inserted in the socket 52 if the transistor has pinlike terminals, or its terminals are properly contacted by the probes 54, 56 and 58. The steps taken to test for the beta of a transistor which is not in a circuit are the same as the second and third step given above. That is, the slider 34 remains on its infinite resistance point 36, since there is no shunt circuit to correct for if the transistor to be tested is not in a circuit.

It will be noted that when the meter reads 10 or X1 on the scale 68 when the moving switch element 40 is in contact with switch point 46, and when the meter reads 1 on the scale 70 when the moving element 40 is in contact with the terminal 44, the same amount of current is flowing in the output electrode or collector to the reference electrode or emitter circuit of transistor 60 as in the control electrode or base to emitter circuit thereof. Therefore, by definition, the beta of the transistor 60 is one as is indicated by the scale 70. The scale 70 is calibrated to give the beta of the transistor 60 for other positions of the needle 13 of the meter 12 when the switch moving element 40 is in the position shown in FIG. 3, if the position of the slider 24 had been adjusted to cause the needle 13 of the meter 12 to indicate 10 or X1 on its scale 70 while the moving element 40 was in contact with the point 46. For example, for a needle 13 position of 2 on the scale 70, the current flowing in the base to emitter circuit of the transistor 60 is one-half the current flowing in the collector to emitter circuit thereof.

If it is desired to test the transistor 60 with other, larger collector to emitter currents, the slider 24 is manipulated in the step illustrated by FIG. 2 to cause the needle 13 of the meter 12 to take the 20 or X2 position on the scale 68 (or to take the position 30 or X3 or any other position on the scale 68 as desired), and then the reading on the scale 70, when the switch moving element 40 is in the position shown in FIG. 3, is multiplied by the multiplier 2 (or 3 or whatever it may be), as had been indicated by the needle 13 of the meter 12 in the position of the switch illustrated in FIG. 2.

Variations of the measuring apparatus and method will occur to a person skilled in the art. While the device for measuring the beta of a transistor either in or out of circuit has been disclosed, the alpha of the transistor 60 may be measured by interchanging the positions of the emitter and base of the transistor 60. While means to measure the amplification factor of an NPN transistor has been disclosed, by proper connection of the voltage sources 14 and 50 and of the meter 12, the amplification factor of a PNP transistor may be measured. Therefore, the above description is to be taken as illustrative and not in a limiting sense.

What I claim is:

1. An amplification factor measuring circuit comprising
   a first and a second terminal for a meter,
   a first, a second and a third contact element for making contacts respectively to the output electrode, the control electrode and the reference electrode of a transistor to be tested,
   a first resistor,
   a circuit from said first contact element through said first resistor to said first meter terminal,
   a first variable resistor having an infinite resistance adjustment,
   a second resistor,
   a circuit from said second contact element through said variable resistor and said second resistor in series to said first meter terminal,
   a switch having two switch points and a moveable arm which can make contact with either one of said points,
   means for connecting one switch point of said switch to said first contact element,
   means for connecting the other switch point of said switch to the junction of said first variable resistor and said second resistor,
   means for connecting the moveable element of said switch to said second meter terminal,
   a first pair of terminals for connection to a source of direct current voltage,
   a circuit from said third contact element to one of said first pair of terminals,
   a circuit from the other terminal of said first pair of terminals to said first meter terminal,
   a second pair of terminals for connection to a source of direct current voltage,
   means for connecting one terminal of said second pair of terminals to said other terminal of said first pair of terminals, said one terminal of said second pair of terminals being of opposite polarity from said other terminal of said first pair of terminals,
   a second variable resistor having an infinite resistance adjustment, and
   means for connecting the other terminal of said second pair of terminals through said second variable resistor to said first contact element.

2. The invention as expressed in claim 1 in which said second resistor has a resistance which is several times that of said first resistor.

3. The invention as expressed in claim 1 in which said second resistor has a resistance which is several times that of said first resistor and in which a meter is connected between said meter terminals, said meter having a scale which indicates the ratio of current flow in said circuit including said first voltage source and said third contact element, to the current flowing in the circuit of said second contact element.

4. The invention according to claim 3 wherein said meter has one needle and two scales, said first scale indicating a plurality of multiplication factors and said second scale indicating said amplification factor divided by a selected one of said multiplication factors said selected one of said multiplication factors being dependent upon the resistive value of said first variable resistor.

5. Apparatus for measuring the current amplification factor of an in-circuit transistor having an output electrode, a control electrode and a reference electrode without removing the transistor from the circuit, comprising:
   means, including a resistance first resistor, for applying a first voltage between said output electrode and said reference electrode and for applying a second voltage across said first resistor;
   adjustable voltage means for applying a third voltage across said resistor, said third voltage having a magnitude equal to and a polarity opposite from the respective magnitude and polarity of said second voltage;
   an input circuit for applying a first current to said control electrode to cause a predetermined current to flow through said resistor; and
   means for measuring the ratio of said predetermined current to said first current.

6. The invention according to claim 5 wherein said input circuit includes a second resistor and said measuring means includes a meter and means for alternately connecting the meter across said first resistor and said second resistor.

7. The invention according to claim 6 wherein said meter has two scales, said first scale indicating a plurality of multiplication factors and said second scale indicating the amplification factor divided by a selected one of said multiplication factors.

8. The method of measuring the amplification factor of a transistor which has an output electrode, a reference electrode and a control electrode comprising the steps of:
applying a voltage across the combination of a resistor coupled in series with the output electrode and reference electrode of said transistor to cause a first current of one polarity to flow through said resistor;
causing a second current equal in magnitude to and opposite in polarity from said first current to flow through said resistor;
causing a third current to flow between said control electrode and said reference electrode without varying said second current to cause a predetermined current to flow through said resistor; and
measuring the ratio of said predetermined current and said third current.

9. The method of measuring the amplification factor of a transistor having an output electrode, a control electrode and a reference electrode when in a circuit and without removing said transistor from said circuit comprising the steps of:
applying a first voltage across a first circuit including a first resistor in series with said output electrode and said reference electrode while leaving a second circuit open, said second circuit including said control electrode and said reference electrode, whereby a first current flows through said first resistor;
applying a second voltage which is variable across said first resistor and varying said second voltage until said first current is negligible;
applying a third voltage which is variable across said control electrode and said reference electrode and varying said third voltage until a predetermined current flows through said first resistance, whereby a second current flows through said second circuit; and
obtaining the ratio of said predetermined current to said second current.

10. The invention according to claim 9 wherein said first voltage is obtained from a direct current voltage source and said second and third voltages are obtained from direct current voltage sources in series with variable resistances, said second and third voltages being varied by varying said variable resistances.